United States Patent Office 3,457,799
Patented July 29, 1969

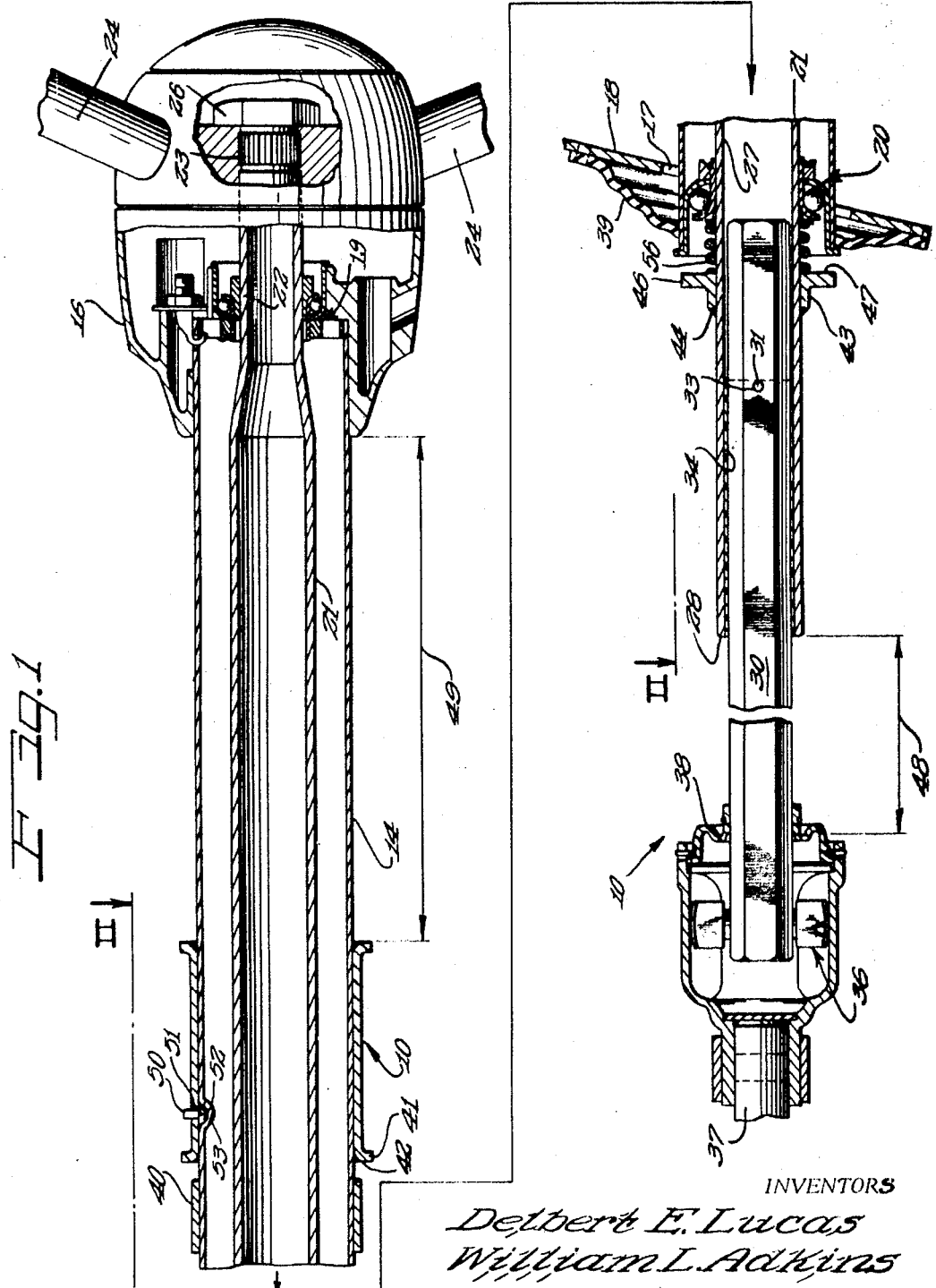

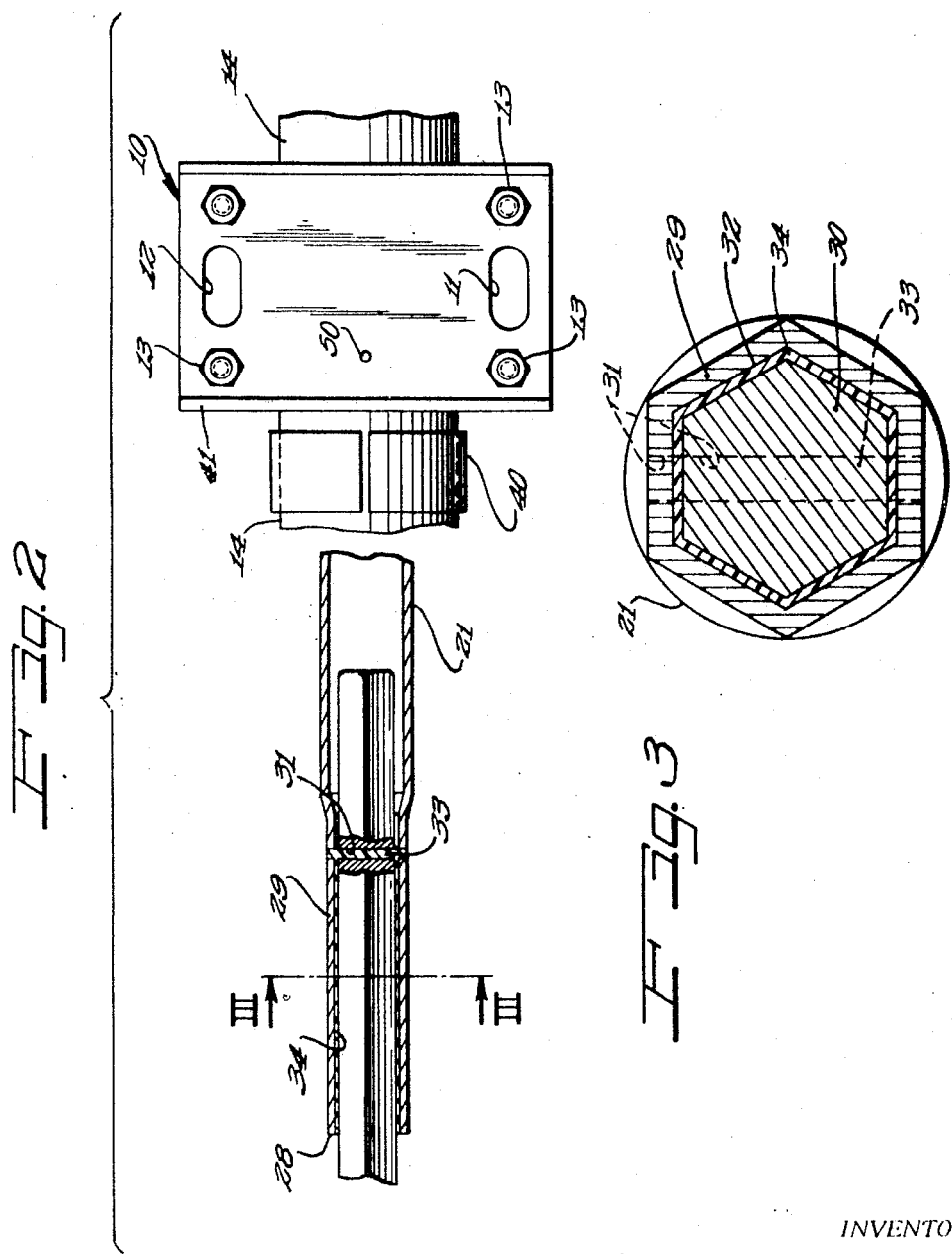

3,457,799
COLLAPSIBLE STEERING COLUMN
Delbert E. Lucas and William L. Adkins, Lafayette, Ind., assignors to TRW Inc., Cleveland, Ohio, a corporation of Ohio
Filed Apr. 14, 1967, Ser. No. 631,010
Int. Cl. B62d 1/18
U.S. Cl. 74—492                                11 Claims

ABSTRACT OF THE DISCLOSURE

A collapsible steering column wherein inner and outer parts comprise a polygonally shaped rod for connection to a steering gear input shaft and a tube telescopically related thereto. The parts have a transverse passage extending therethrough as well as an annular recess formed therebetween and plastic material completely fills the annular recess and the passage to form a transverse shear pin and a no-lash guide bearing between the parts. The steering shaft thus provided extends through a tubular jacket mounted in a dash support bracket. The tubular jacket is capable of axial displacement through the bracket in response to abnormal axial loads and energy absorption means are provided between the bracket and the jacket comprising detents such as one or more deforming protrusions or deforming pins to produce the desired energy absorption.

BACKGROUND OF THE INVENTION

Field of the invention

This invention relates generally to steering columns and more particularly relates to a steering column with axially adjustable parts and which parts are collapsible in response to abnormal forces such as may occur upon impact or collision.

SUMMARY OF THE INVENTION

In accordance with the present invention, a collapsible steering column is provided wherein a dash support bracket is adapted to be stationarily mounted in a vehicle and has a cylindrical clamping bore. A tubular jacket extends through the clamping bore and is intended to be relatively non-rotatable, but in response to abnormal axially directed forces, the tubular jacket will move through the cylindrical bore of the dash support bracket. Energy absorption means are provided between the bracket and the jacket and may take the form of single or multiple pins of various sizes to produce the desired energy absorption. For example, a deforming pin carried by the bracket will engage a deformable material provided by the jacket. Alternatively, several pins may be staged in preformed grooves of various lengths, thereby to yield at a predetermined rate of increased energy absorption as a function of displacement.

Extending through the jacket and rotatably journaled therein is a steering shaft which, in accordance with the principles of the present invention, comprises inner and outer parts. The outer part is a tube to which a steering wheel is connected at one end. At the other end, a polygonally shaped rod adapted to be coupled to a steering gear input shaft telescopes into the tube. Between the inner and outer parts there is formed an annular recess and the parts are also characterized by a transverse passage which extends completely therethrough. A plastic material is injected into the annular recess and into the transverse passage, thereby to form a plastic shear pin as well as a no-lash guide bearing for supporting the rod in the tube.

In response to an abnormal impact force, the shear pin will break and the inner and outer parts will telescope, thereby providing additional collapse and front end contraction to safeguard the operator against physical injury.

A travel stop is provided on the external surface of the wheel tube, thereby to prevent rearward motion thereof during a collision impact.

DESCRIPTION OF THE DRAWINGS

FIGURE 1 is a cross-sectional view showing a steering column provided in accordance with the principles of the present invention;

FIGURE 2 is a top view with parts shown in cross-section of the structure of FIGURE 1 and is taken generally on line II—II of FIGURE 1; and FIGURE 3 is a cross-sectional view taken on line III—III of FIGURE 2.

DESCRIPTION OF THE PREFERRED EMBODIMENT

Although the principles of the present invention are described in connection with an installation of a steering column in a passenger vehicle of the type having a front firewall, it will be understood that the present invention may be advantageously utilized in any vehicular environment wherein axial contraction in a steering column is desirable.

In accordance with the principles of the present invention, there is provided a dash support bracket shown generally at 10. The bracket 10 has a pair of slots 11 and 12 formed therein (FIGURE 2), thereby providing a two-point dash mounting arrangement which affords a self-aligning feature. A plurality of fasteners are shown at 13.

The dash support bracket provides a cylindrical bore through which extends a tubular column jacket shown generally at 14. At the upper end of the tubular jacket 14 is provided a fascia hub 16. The other end of the tubular jacket 14 extends through an opening 17 formed in a firewall shown at 18.

Mounted interiorly of the fascia hub 16 is a bearing assembly shown generally at 19. At the opposite end of the jacket tube 14 is formed a second bearing assembly shown generally at 20. The spaced bearing assemblies 19 and 20 support and rotatably journal a steering shaft which extends through the jacket tube 14. The steering shaft, in accordance with the principles of the present invention, comprises a two-part construction which, in this form of the invention, includes inner and outer parts which are also lower and upper parts, respectively. Thus, the outer part which is also the upper part comprises a tubular member 21 having a reduced section 22 carried in the bearing assembly 19 and having its end portion terminating in a splined coupling 23 to which is co-rotatably connected a steering wheel 24 fastened by means of a nut 26 and by means of which steering signals may be applied to the steering assembly by the operator of the vehicle.

The tube 21 has a second portion 27 supported in the bearing assembly 20 and a substantial portion thereof projects through the opening 17 of the firewall 18 terminating in an end portion 28.

As shown in FIGURE 2, a portion of the wheel tube 21 is shaped into the configuration of a hexagonal tube 29 in which is telescopically received a correspondingly shaped hexagonal rod member 30 forming the inner part of the steering shaft and also the lower part thereof in the orientation of the present disclosure. It will be appreciated that the hexagonal shape of the present disclosure is merely exemplary and that any polygonal shape could be employed.

A transverse passage extends completely through the parts at the complementary shaped portions thereof as shown at 31. Moreover, the rod member 30 is sufficiently smaller than the concentrically outwardly adjacent portion 29 that there is provided a slight annular recess 32.

It is contemplated, in accordance with the principles of the present invention, that a plastic material be injected into the annular space 32 and into the passage 31, thereby to form a plastic shear pin 33 and a no-lash guide bearing 34 for the rod 30 in the wheel tube 21.

The free end of the rod 30 is shown connected to a flexible couple, such as a universal joint shown generally at 36, and which effects a coupling connection to a steering gear input shaft shown at 37. The usual sealing diaphragm is illustrated at 38. A sealing means between the jacket tube 14 and the firewall 18 is also shown at 39. A split ring 40 is connected to the tube jacket 14 and it will be noted that an outwardly turned flange 41 is formed on the dash support bracket 10, thereby to form an abutment surface 42.

There is further provided, in accordance with the principles of the present invention, a travel stop which comprises a ring member 43 connected on the external peripheral surface of the wheel tube 21 by means of a weldment 44. The ring 43 has a radially outwardly extending flange 46, thereby forming an abutment surface 47 to prevent rearward motion of the wheel tube 21 in response to axial displacement forces which may occur during a collision impact.

As shown at the lefthand side of FIGURE 1, there is provided a collapse and front end contraction dimension 48 which constitutes the amount of relative axial collapse available through the telescoping action of the inner and outer steering shaft parts. At the righthand side of FIGURE 1, there is provided a dimension shown at 49 which represents the axial collapse available through displacement of the tube jacket 14 through the dash support bracket 10.

It is contemplated by the present invention that energy absorption means be provided between the dash support bracket and the jacket tube 14. In the form of the invention illustrated in FIGURE 1, a deforming pin is shown at 50 and is seated in an opening 51 formed in the wall of the dash support bracket 10. A rounded head 52 on the deforming pin 50 extends inwardly thereof and is received in a dimpled embossment 53 formed in the wall of the tube jacket 14. The tube jacket 14 is preferably made of a deformable metal so that upon relative axial displacement, the head 52 will displace and thereby deform the metal wall of the tube jacket 14 to produce the desired energy absorption. It will be appreciated that the pin 50 could be provided in multiple quantity or in different sizes to selectively vary the desired level of energy absorption. Further, instead of providing a dimpled embossment 53, it is also contemplated with the present invention that pin means be staged in preformed grooves of various lengths to yield at a predetermined rate of increase of energy absorption as a function of the axial displacement.

A coil spring is shown at 56 and has its coils bottomed against the abutment surface 47 at one end and is bottomed against the bearing assembly 20 at its other end, thereby to normally retain the steering shaft in proper axial alignment relative to the tube jacket 14.

In operation, if the steering column of the present invention is subjected to an abnormal axial loading through a collision impact or the like, the shear pin 33 will be broken and the inner and outer parts of the steering shaft will telescope. Because of the plastic 34 between the inner and outer parts, there is not only a no-lash fit between the parts but the plastic forms a guide bearing for the rod 30 as it moves axially in the wheel tube 21 during the telescoping action.

Axial collapse is made available through relative movement of the jacket tube 14 through the dash support bracket 10. Moreover, as such relative axial movement takes place, the deforming pin 50 will operate to absorb energy. Accordingly, the operator of the vehicle will be safeguarded against injury likely to occur through impact with the steering wheel 24 and, further, there will be no disadvantage because of any backlash. Further, maximum operability of the steering shaft is always insured because of the co-rotatable relationship effected by the fitted-together inner and outer parts.

Although various modifications might be suggested by those versed in the art, it should be understood that we wish to embody within the scope of the patent warranted hereon all such modifications as reasonably and properly come within the scope of our contribution to the art.

We claim as our invention:

1. A collapsible steering column comprising:
   a dash support bracket adapted to be stationarily mounted in a vehicle and having a clamping bore,
   a tubular jacket in said dash support bracket and extending through said clamping bore, and
   a steering shaft extending through said jacket comprising upper and lower telescoping parts,
      said upper part comprising a tube having a steering wheel connected to one end on one side of said dash support bracket,
   longitudinally spaced bearing means supporting said upper part in said tubular jacket,
      said lower part comprising a polygonally shaped rod member adapted to be coupled to a steering gear input shaft and having a portion extending into the other end of said upper part with an annular space therebetween,
      said upper and lower parts each having a transverse passage extending therethrough and respectively communicating with said annular space, and
   plastic material filling said annular space and said passages to form an integral member having a transverse shear pin and a no-lash guide bearing between said rod member and said tube,
whereby abnormal axial loading of said steering column will shear said pin and telescope said rod into said tube and force said jacket axially through said clamping bore.

2. A collapsible steering column comprising:
   a dash support bracket adapted to be stationarily mounted in a vehicle and having a clamping bore,
   a tubular jacket in said dash support bracket and extending through said clamping bore, and
   a steering shaft extending through said jacket comprising upper and lower telescoping parts,
      said upper part comprising a tube having a steering wheel connected to one end on one side of said dash support bracket,
   longitudinally spaced bearing means supporting said upper part in said tubular jacket,
      said lower part comprising a polygonally shaped rod member adapted to be coupled to a steering gear input shaft and having a portion extending into the other end of said upper part with an annular space therebetween,
      said upper and lower parts having a transverse passage extending therethrough,
   plastic material filling said annular space and said passage to form a transverse shear pin and a no-lash guide bearing therebetween,
whereby abnormal axial loading of said steering column will shear said pin and telescope said rod into said tube and force said jacket axially through said clamping bore, and energy absorption means between said dash support bracket and said tubular jacket.

3. A collapsible steering column as defined in claim 2 wherein said energy absorption means comprises:
   a deforming pin carried in said bracket and wherein said tubular jacket comprises a deformable material yieldably engaging said pin.

4. A collapsible steering column as defined in claim 2 wherein said energy absorption means comprises:
   a plurality of pins carried in said bracket and staged in preformed grooves in said jacket for yielding a predetermined rate of increase of energy absorption as a function of relative axial displacement between said bracket and said jacket.

5. A collapsible steering column comprising:
a dash support bracket adapted to be stationarily mounted in a vehicle and having a clamping bore,
a tubular jacket in said dash support bracket and extending through said clamping bore, and
a steering shaft extending through said jacket comprising upper and lower telescoping parts,
   said upper part comprising a tube having a steering wheel connected to one end on one side of said dash support bracket,
longitudinally spaced bearing means supporting said upper part in said tubular jacket,
   said lower part comprising a polygonally shaped rod member adapted to be coupled to a steering gear input shaft and having a portion extending into the other end of said upper part with an annular space therebetween,
   said upper and lower parts having a transverse passage extending therethrough,
plastic material filling said annular space and said passage to form a transverse shear pin and a no-lash guide bearing therebetween,
whereby abnormal axial loading of said steering column will shear said pin and telescope said rod into said tube and force said jacket axially through said clamping bore,
   a travel stop on said outer part and providing an abutment projecting radially outwardly for engagement with said tubular jacket,
thereby to prevent axial movement of said steering shaft toward the vehicle operator.

6. A collapsible steering column as defined in claim 5 and further characterized by:
   said travel stop comprising a flanged annular ring connected in firm assembly with said tube.

7. In a collapsible steering column the improvement of:
a clamping bracket,
and a jacket extending therethrough,
   said jacket comprising a tubular member moving axially through said bracket in response to abnormal axial forces applied thereto,
and energy absorption means between said bracket and said jacket,
thereby to absorb and dissipate energy upon relative axial movement therebetween.

8. In a collapsible steering column as defined in claim 7:
   said energy absorption means comprising a deforming pin in said bracket,
   and said jacket comprising a tube made of a deformable material engaged by said pin upon relative movement therebetween.

9. In a collapsible steering column as defined in claim 7:
   said energy absorption means comprising a plurality of pins carried in said bracket and staged in preformed grooves in said jacket for yielding a predetermined rate of increase of energy absorption as a function of relative axial displacement between said bracket and said jacket.

10. A collapsible steering column as defined in claim 1 and further characterized by:
   said tube having a portion complementary in shape to said rod member between which said annular recess is formed.

11. A collapsible steering column for dirigible vehicles which comprises:
   first and second splined telescoping parts,
   first means designed to break at a predetermined impact load holding said parts in axially fixed relation,
   a steering wheel on one of said parts,
   a steering gear input means coupled to the other of said parts,
   bracket means carried by the vehicle slidably supporting said one part, and
   second means between said bracket means and said one part designed to impart a desired resistance to sliding movement of said one part upon breaking of said first means.

References Cited
UNITED STATES PATENTS

| | | | |
|---|---|---|---|
| 2,639,626 | 5/1953 | Snyder | 74—493 |
| 2,852,956 | 9/1958 | May | 74—493 |
| 3,262,332 | 7/1966 | Wight | 74—493 |
| 3,373,629 | 3/1968 | Wight et al. | 74—492 |
| 3,373,630 | 3/1968 | Heurtebise | 74—492 |

MILTON KAUFMAN, Primary Examiner